(12) United States Patent
Huang et al.

(10) Patent No.: US 12,381,596 B2
(45) Date of Patent: Aug. 5, 2025

(54) ANTENNA APPARATUS AND ELECTRONIC DEVICE

(71) Applicant: GUANGDONG OPPO MOBILE TELECOMMUNICATIONS CORP., LTD., Dongguan (CN)

(72) Inventors: Wuxin Huang, Dongguan (CN); Si Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 416 days.

(21) Appl. No.: 17/992,346

(22) Filed: Nov. 22, 2022

(65) Prior Publication Data

US 2023/0101129 A1    Mar. 30, 2023

Related U.S. Application Data

(63) Continuation-in-part of application No. PCT/CN2021/089682, filed on Apr. 25, 2021.

(30) Foreign Application Priority Data

May 26, 2020 (CN) .......................... 202010456231.9
May 26, 2020 (CN) .......................... 202011051896.8

(51) Int. Cl.
*H01Q 1/24*     (2006.01)
*H01Q 1/22*     (2006.01)
*H04B 5/26*     (2024.01)

(52) U.S. Cl.
CPC ............ *H04B 5/26* (2024.01); *H01Q 1/2216* (2013.01); *H01Q 1/243* (2013.01)

(58) Field of Classification Search
CPC ............ H01Q 5/335; H01Q 5/35; H01Q 9/42; H01Q 1/36; H01Q 1/22; H01Q 1/44;
(Continued)

(56) References Cited

U.S. PATENT DOCUMENTS

| 10,396,438 B1 | 8/2019 | Smith et al. | |
| 2016/0056526 A1* | 2/2016 | Li | H01Q 9/42 343/702 |

(Continued)

FOREIGN PATENT DOCUMENTS

| CN | 204760528 U | 11/2015 |
| CN | 105742784 A | 7/2016 |

(Continued)

OTHER PUBLICATIONS

International Search Report and Written Opinion dated Jul. 21, 2021 in International Application No. PCT/CN2021/089682. English translation attached.

(Continued)

*Primary Examiner* — Angelica Perez

(74) *Attorney, Agent, or Firm* — Sheppard, Mullin, Richter & Hampton LLP

(57) ABSTRACT

Provided are an antenna apparatus and an electronic device. The antenna apparatus includes a radiator, a near-field communication chip and a first non-near-field communication chip. The radiator includes a ground point and a first feeding point that are spaced apart from each other, and the ground point is grounded. The near-field communication chip is configured to provide a differential excitation current. The first non-near-field communication chip is configured to provide a first non-near-field communication excitation current.

20 Claims, 9 Drawing Sheets

(58) Field of Classification Search
CPC .......... H01Q 1/48; H01Q 1/50; H01Q 1/2216; H01Q 1/243; H04B 5/24; H04B 5/26
See application file for complete search history.

(56) References Cited

U.S. PATENT DOCUMENTS

| | | | |
|---|---|---|---|
| 2016/0190693 A1 | 6/2016 | Wu | |
| 2016/0315373 A1* | 10/2016 | Azad | H01Q 1/48 |
| 2016/0380337 A1* | 12/2016 | Lee | H04B 5/26 |
| | | | 343/702 |
| 2017/0338541 A1* | 11/2017 | Tsai | H01Q 7/00 |
| 2018/0145398 A1 | 5/2018 | Lilja et al. | |
| 2018/0331416 A1 | 11/2018 | Yu et al. | |
| 2019/0165836 A1* | 5/2019 | Irci | H04B 5/77 |
| 2019/0372201 A1* | 12/2019 | Zhu | H01Q 1/48 |

FOREIGN PATENT DOCUMENTS

| | | |
|---|---|---|
| CN | 106450697 A | 2/2017 |
| CN | 107317096 A | 11/2017 |
| CN | 107546461 A | 1/2018 |
| CN | 108288753 A | 7/2018 |
| CN | 109510631 A | 3/2019 |
| CN | 211929698 U | 11/2020 |
| CN | 112448126 A | 3/2021 |
| CN | 113725592 A | 11/2021 |
| JP | 2016027764 A | 2/2016 |
| WO | 2012128601 A2 | 9/2012 |
| WO | 2019204988 A1 | 10/2019 |

OTHER PUBLICATIONS

Extended European Search Report dated Sep. 29, 2023 received in European Patent Application No. 1 EP21814308.9.

The First Office Action from corresponding Chinese Application No. 202011051896.8 dated Aug. 22, 2024. English translation attached.

The First Office Action from corresponding Chinese Application No. 202010456231.9 dated Sep. 20, 2024. English translation attached.

* cited by examiner

ANTENNA APPARATUS AND ELECTRONIC DEVICE

CROSS-REFERENCE TO RELATED APPLICATIONS

This application is a continuation-in-part of International Application No. PCT/CN2021/089682 entitled "ANTENNA APPARATUS AND ELECTRONIC DEVICE" filed on Apr. 25, 2021, which claims priorities to Chinese Patent Application No. 202010456231.9 entitled "ANTENNA APPARATUS AND ELECTRONIC DEVICE" and filed with China National Intellectual Property Administration on May 26, 2020, and Chinese Patent Application No. 202011051896.8 entitled "ANTENNA APPARATUS AND ELECTRONIC DEVICE" and filed with China National Intellectual Property Administration on May 26, 2020, the entire contents of all of which are incorporated herein by reference.

FIELD

The present disclosure relates to the field of communication technologies, and more particularly, to an antenna apparatus and an electronic device.

BACKGROUND

With the development of communication technology, electronic devices such as smart phones can realize more and more functions, and the communication modes of the electronic devices are also more diversified. For example, the electronic devices can gradually realize a Near Field Communication (NFC) function recently.

SUMMARY

Embodiments of the present disclosure provide an antenna apparatus and an electronic device, which can realize reusing of a first non-near-field communication antenna, thereby simplifying the design of an NFC antenna.

In a first aspect, an embodiment of the present disclosure provides an antenna apparatus. The antenna includes a radiator, a near-field communication chip and a first non-near-field communication chip. The radiator includes a ground point and a first feeding point that are spaced apart from each other. The ground point is grounded. The near-field communication chip includes a first differential signal terminal and a second differential signal terminal. The first differential signal terminal and the second differential signal terminal are configured to provide a differential excitation current. The first differential signal terminal and the second differential signal terminal are respectively electrically connected to two ends of the radiator. A part between the two ends is configured to transmit the differential excitation current. The first non-near field communication chip is configured to provide a first non-near-field communication excitation current. The first non-near-field communication chip is electrically connected to the first feeding point. A part between the first feeding point and the ground point is configured to transmit the first non-near-field communication excitation current.

In a second aspect, an embodiment of the present disclosure provides an antenna apparatus. The antenna includes a radiator, a grounding conductor, and a near-field communication chip. The radiator includes a ground point. The grounding conductor has one end connected to the ground point and another end grounded. The near-field communication chip includes a first differential signal terminal and a second differential signal terminal. The first differential signal terminal and the second differential signal terminal are configured to provide a differential excitation current. The first differential signal terminal and the second differential signal terminal are respectively electrically connected to two ends of the radiator. A part between the two ends is configured to transmit the differential excitation current. The grounding conductor is configured to provide a grounding path and a return path for the differential excitation current.

In a third aspect, an embodiment of the present disclosure also provides an electronic device. The electronic device includes an antenna apparatus and a metal frame. The antenna apparatus includes a radiator, a near-field communication chip, and a first non-near-field communication chip. The radiator includes a ground point and a first feeding point that are spaced apart from each other. The ground point is grounded. The near-field communication chip includes a first differential signal terminal and a second differential signal terminal. The first differential signal terminal and the second differential signal terminal are configured to provide a differential excitation current. The first differential signal terminal and the second differential signal terminal are respectively electrically connected to two ends of the radiator. A part between the two ends is configured to transmit the differential excitation current. The first non-near-field communication chip is configured to provide a first non-near-field communication excitation current. The first non-near-field communication chip is electrically connected to the first feeding point. A part between the first feeding point and the ground point is configured to transmit the first non-near-field communication excitation current. The metal frame has a metal branch formed thereon. The metal branch forms the radiator of the antenna apparatus.

In a fourth aspect, an embodiment of the present disclosure also provides an electronic device. The electronic device includes an antenna apparatus and a metal frame. The antenna apparatus includes a radiator, a grounding conductor and a near-field communication chip. The radiator includes a ground point. The grounding conductor has one end connected to the ground point and another end grounded. The near field communication chip includes a first differential signal terminal and a second differential signal terminal. The first differential signal terminal and the second differential signal terminal are configured to provide a differential excitation current. The first differential signal terminal and the second differential signal terminal are respectively electrically connected to two ends of the radiator. A part between the two ends is configured to transmit the differential excitation current. The grounding conductor is configured to provide a grounding path and a return path for the differential excitation current. The metal frame having a metal branch formed thereon. The metal branch forms the radiator of the antenna apparatus.

BRIEF DESCRIPTION OF THE DRAWINGS

In order to clearly explain technical solutions of embodiments of the present disclosure, drawings used in the embodiments will be briefly described below. Obviously, the drawings as described below are merely some embodiments of the present disclosure. Based on these drawings, other drawings can be obtained by those skilled in the art without inventive effort.

DETAILED DESCRIPTION

The technical solutions in the embodiments of the present disclosure will be clearly and completely described below with reference to the accompanying drawings in the embodiments of the present disclosure. Apparently, the described embodiments are only some of the embodiments of the present disclosure, but not all of the embodiments. Based on the embodiments in the present disclosure, all other embodiments obtained by those skilled in the art without inventive work fall within the protection scope of the present disclosure.

An electronic device is provided according to an embodiment of the present disclosure. The electronic device may be a smartphone, a tablet computer, etc., or a game device, an Augmented Reality (AR) device, a car device, a data storage device, an audio playback device, a video playback device, a notebook computer, or a desktop computing device, etc.

Figure 1:
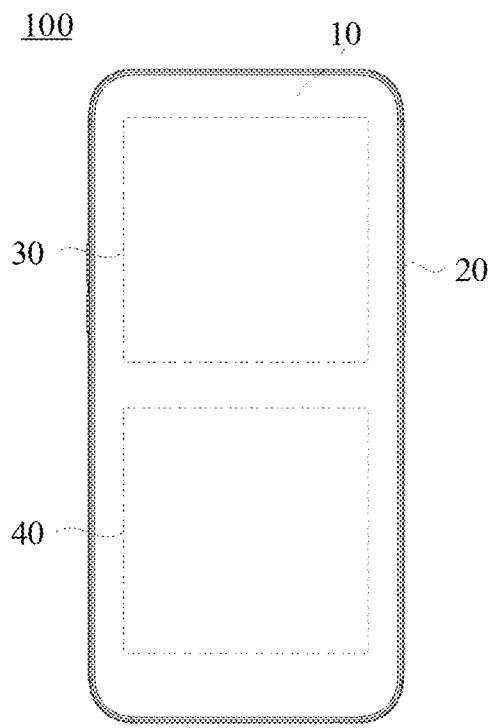
FIG. 1 is a schematic diagram of an electronic device having a first structure according to an embodiment of the present disclosure.

FIG. 1 is a schematic diagram of an electronic device 100 having a first structure according to an embodiment of the present disclosure.

The electronic device 100 includes a display screen 10, a housing 20, a circuit board 30 and a battery 40.

The display screen 10 is disposed on the housing 20 to form a display surface of the electronic device 100 for displaying information such as images and texts. The display screen 10 may include a screen such as a Liquid Crystal Display (LCD) screen or an Organic Light-Emitting Diode (OLED) screen.

It can be understood that a cover plate may also be provided on the display screen 10 to protect the display screen 10 and prevent the display screen 10 from being scratched or damaged by water. The cover plate may be a transparent glass cover plate, so that the user can observe the content displayed on the display screen 10 through the cover plate. For example, the cover plate may be a glass cover plate made of sapphire.

The housing 20 forms an outer contour of the electronic device 100 to accommodate electronic components, functional components, etc. of the electronic device 100, and at the same time to provide a sealing and protecting function for the electronic components and the functional components inside the electronic device. For example, a camera, a circuit board, a vibration motor and other functional components of the electronic device 100 may be disposed inside the housing 20. The housing 20 may include a middle frame, a metal frame and a battery cover.

The middle frame can be a thin-plate-like structure or a thin-flake-like structure, or can be a hollow frame structure. The middle frame provides support for the electronic components or the functional components in the electronic device 100 so as to mount the electronic components and the functional components of the electronic device 100 together. For example, structures such as through grooves, protrusions, through holes and the like may be defined on the middle frame, to facilitate the installation of the electronic components or the functional components of the electronic device 100. It can be understood that the middle frame may be made of a material such as metal or plastic.

The metal frame surrounds the periphery of the middle frame, so that the metal frame can be formed on an outer periphery of the electronic device 100. It can be understood that the metal frame and the middle frame can be formed separately or integrally formed.

The battery cover is connected to the middle frame. For example, the battery cover may be attached to the middle frame by an adhesive such as double-sided tape to realize the connection with the middle frame. The battery cover is used together with the middle frame and the display screen 10 to seal the electronic components and the functional components of the electronic device 100 inside the electronic device 100, so as to protect the electronic components and the functional components of the electronic device 100. It can be understood that the battery cover can be integrally formed. During the forming process of the battery cover, structures such as a rear camera mounting hole may be defined on the battery cover. It can be understood that the battery cover may be made of a material such as metal or plastic.

The circuit board 30 is disposed inside the housing 20. For example, the circuit board 30 may be fixedly mounted on the middle frame of the housing 20, and the circuit board 30 may be sealed inside the electronic device by the battery cover. The circuit board 30 may be a main board of the electronic device 100. One or more of functional components such as a processor, a camera, an earphone interface, an acceleration sensor, a gyroscope, and a motor may be integrated on the circuit board 30. The display screen 10 may be electrically connected to the circuit board 30 so that the display of the display screen 10 may be controlled by the processor on the circuit board 30.

The battery 40 is disposed inside the housing 20. For example, the battery 40 may be fixedly mounted on the middle frame of the housing 20, and the battery 40 may be sealed inside the electronic device by the battery cover. The battery 40 is electrically connected to the circuit board 30, so that the battery 40 can supply power to the electronic device 100. A power management circuit may be provided on the circuit board 30. The power management circuit is configured to distribute the voltage provided by the battery 40 to various electronic components in the electronic device 100.

An antenna apparatus 200 is provided in the electronic device 100. The antenna apparatus 200 is configured to implement a wireless communication function of the electronic device 100. For example, the antenna apparatus 200 may be configured to implement a Near-Field Communication (NFC) function. The antenna apparatus 200 is disposed inside the housing 20 of the electronic device 100. It can be understood that some components of the antenna apparatus 200 may be integrated on the circuit board 30 inside the housing 20. For example, a signal processing chip and a signal processing circuit in the antenna apparatus 200 may be integrated on the circuit board 30. Some components of the antenna apparatus 200 may be directly disposed inside the housing 20. For example, a radiator of the antenna apparatus 200 may be directly disposed inside the housing 20.

Figure 2:
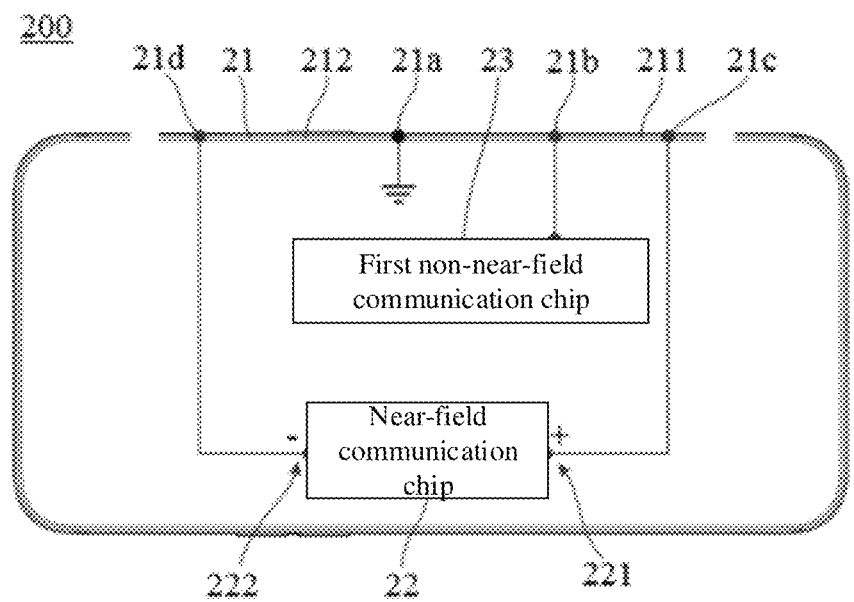
FIG. 2 is a schematic diagram of an antenna apparatus having a first structure according to an embodiment of the present disclosure.

Reference will be made to FIG. 2. FIG. 2 is a schematic diagram of an antenna apparatus 200 having a first structure according to an embodiment of the present disclosure.

The antenna apparatus 200 includes a radiator 21, a Near-Field Communication chip (NFC chip) 22 and a first non-near-field communication chip 23.

The radiator 21 includes a ground point 21*a*, and the ground point 21*a* is grounded. The ground point 21*a* may be connected to a main ground of the electronic device 100, for example, to a main ground on the circuit board 30.

The ground point 21*a* divides the radiator 21 into two portions, namely, a first portion 211 and a second portion 212. The first portion 211 is located at one end of the radiator 21, and the second portion 212 is located at the other end of the radiator 21 which is opposite to the one end of the radiator 21. It can be understood that the ground point 21*a* is a potential zero point, so the potentials of the first portion 211 and the second portion 212 are both greater than zero. Therefore, it can also be understood that the ground point 21*a* divides the radiator 21 into the first portion 211 and the second portion 212 in terms of potential.

It can be understood that the radiator 21 may be any radiator structure in the electronic device 100. For example, the radiator 21 may be an independent radiator, a printed circuit on the circuit board 30, or a metal branch formed on the middle frame of the electronic device 100. The radiator 21 can be rigid or flexible. The radiator 21 may be made of a material with a high electrical conductivity such as copper, magnesium, aluminum, or silver.

Figure 3:
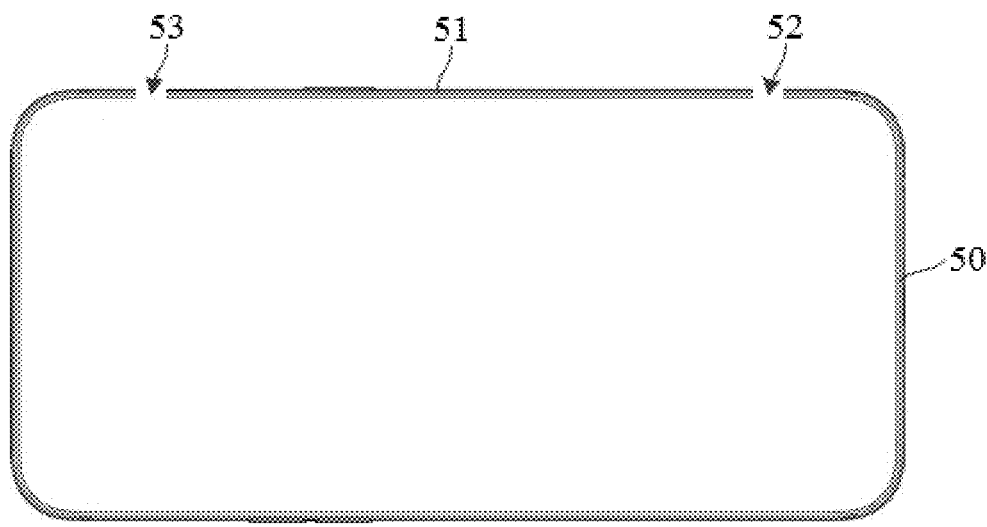
FIG. 3 is a schematic diagram of an electronic device having a second structure according to an embodiment of the present disclosure.

Reference will be made to FIG. 3. FIG. 3 is a schematic diagram of an electronic device 100 having a second structure according to an embodiment of the present disclosure.

The electronic device 100 includes a metal frame 50. The metal frame 50 can be used as a part of the housing 20. The metal frame 50 may be, for example, an aluminum alloy frame, a magnesium alloy frame, or the like. The metal frame 50 may surround the periphery of the middle frame of the electronic device 100. A metal branch 51 is formed on the metal frame 50. For example, a first slit 52 and a second slit 53 may be defined at intervals on the metal frame 50, and the metal branch 51 is formed between the first slit 52 and the second slit 53. The radiator 21 of the antenna apparatus 200 includes the metal branch 51. That is, the metal branch 51 forms the radiator 21.

It can be understood that the metal branch 51 may be formed on a long side of the metal frame 50, as shown in FIG. 3. In some other embodiments, the metal branch 51 may be formed on a short side, a corner or other position of the metal frame 50.

Therefore, the radiator 21 does not need to be separately provided on the electronic device 100, and the radiator 21 can be formed by the metal frame 50, thereby simplifying the design of the antenna.

In the description of the present disclosure, it should be understood that terms such as "first", "second" and the like are only used to distinguish similar objects, and cannot be interpreted as indicating or implying relative importance or implying the number of indicated features.

Figure 4:
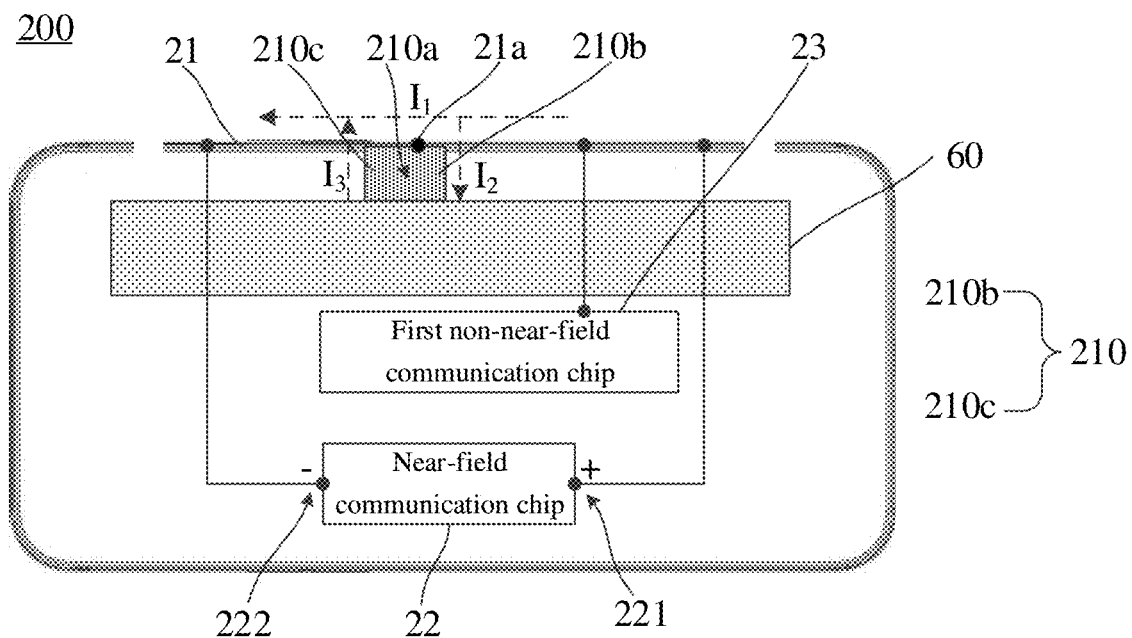
FIG. 4 is a schematic diagram of an antenna apparatus having a second structure according to an embodiment of the present disclosure.

Reference will be made to FIG. 4. FIG. 4 is a schematic diagram of an antenna apparatus 200 having a second structure according to an embodiment of the present disclosure.

The antenna apparatus 200 includes a radiator 21, a Near-Field Communication chip (NFC chip) 22 and a grounding conductor 210.

The radiator 21 includes a ground point 21*a*, and the ground point 21*a* is grounded. The ground point 21*a* may be connected to a main ground of the electronic device 100, for example, to a main ground on the circuit board 30.

It can be understood that the radiator 21 may be any radiator structure in the electronic device 100. For example, the radiator 21 may be an independent radiator, a printed circuit on the circuit board 30, or a metal branch formed on the middle frame of the electronic device 100. The radiator 21 can be rigid or flexible. The radiator 21 may be made of a material with a high electrical conductivity such as copper, magnesium, aluminum, or silver.

One end of the grounding conductor 210 is connected to the ground point 21*a*, and the other end of the grounding conductor 210 is grounded. For example, the electronic device 100 includes a metal middle frame 60 that may be formed as a system ground of the electronic device 100. The other end of the grounding conductor 210 may be connected to the metal middle frame 60 to realize being grounded. The grounding conductor 210 can be understood as a metal connecting rib between the radiator 21 and the metal middle frame 60. It can be understood that the grounding conductor 210 can be integrally formed with the metal middle frame 60, for example, can be integrally formed with the metal middle frame 60 by an injection molding process.

The NFC chip 22 can be configured to provide a differential excitation current. The differential excitation current includes two current signals. The two current signals have a same amplitude and opposite phases, or it can be understood that the phases of the two current signals differ by 180 degrees. Furthermore, the differential excitation current is a balanced signal. It can be understood that in the process of transmission of an analog signal, if the analog signal is directly transmitted, it is an unbalanced signal; if the phase of the original analog signal is inverted, and then the inverted analog signal and the original analog signal are transmitted at the same time, the inverted analog signal and the original analog signal are called the balanced signal. Compared with the unbalanced signal, the balanced signal has a better anti-interference performance.

The grounding conductor 210 is configured to provide a grounding path and a return path for the differential excitation current.

Continuing to refer to FIG. 2 or FIG. 4, the NFC chip 22 may be configured to provide the differential excitation current. The differential excitation current includes two current signals. The two current signals have a same amplitude and opposite phases, or it can be understood that the phases of the two current signals differ by 180 degrees. Furthermore, the differential excitation current is a balanced signal. It can be understood that in the process of transmission of an analog signal, if the analog signal is directly transmitted, it is an unbalanced signal; if the phase of the original analog signal is inverted, and then the inverted analog signal and the original analog signal are transmitted at the same time, the inverted analog signal and the original analog signal are called the balanced signal. Compared with the unbalanced signal, the balanced signal has a better anti-interference performance.

The NFC chip 22 may be disposed on the circuit board 30 of the electronic device 100. Alternatively, a smaller independent circuit board may be provided in the electronic device 100, and the NFC chip 22 may be integrated on the independent circuit board. The independent circuit board may be, for example, a flexible circuit board in the electronic device 100.

The NFC chip 22 includes a first differential signal terminal 221 and a second differential signal terminal 222. For example, the first differential signal terminal 221 may be a positive (+) terminal of the NFC chip 22, and the second differential signal terminal 222 may be a negative (−) terminal of the NFC chip 22. The first differential signal terminal 221 and the second differential signal terminal 222 are configured to provide the differential excitation current. For example, the differential excitation current provided by the NFC chip 22 can be output through the first differential signal terminal 221 and returns to the NFC chip 22 through the second differential signal terminal 222 so as to form a current loop.

The first differential signal terminal 221 and the second differential signal terminal 222 are electrically connected to two ends of the radiator 21 respectively. The two ends are opposite ends of the radiator 21, one end of which may be the end where the first portion 211 is located, and the other end of which may be the end where the second portion 212 is located. For example, the first differential signal terminal 221 is electrically connected to the first portion 211 of the radiator 21, and the second differential signal terminal 222 is electrically connected to the second portion 212 of the radiator 21. Therefore, the first differential signal terminal 221, the first portion 211, the second portion 212, and the second differential signal terminal 222 can form a signal loop. The first portion 211 and the second portion 212 can be configured to transmit the differential excitation current, that is, a part between the two ends is configured to transmit the differential excitation current. It can be understood that when the part between the two ends transmits the differential excitation current, the NFC signal can be radiated to the outside, thereby realizing the NFC function of the electronic device 100. Therefore, the part between the two ends can be used as an NFC antenna, that is, the first portion 211 and the second portion 212 can be used as the NFC antenna to realize the NFC function of the electronic device 100.

It can be understood that a feeding point may be provided on the radiator 21 for feeding the differential excitation current. For example, the radiator 21 includes a feeding point 21c and a feeding point 21d. The feeding point 21c may be denoted as a second feeding point, and the feeding point 21d may be denoted as a third feeding point. The second feeding point 21c and the third feeding point 21d are located on opposite sides of the ground point 21a. For example, the second feeding point 21c may be located at one end of the radiator 21, and the third feeding point 21d may be located at the other end of the radiator 21.

The first differential signal terminal 221 is electrically connected to the second feeding point 21c, and the second differential signal terminal 222 is electrically connected to the third feeding point 21d. Therefore, the NFC chip 22 can feed the differential excitation current to the radiator 21 through the second feeding point 21c and the third feeding point 21d.

The first non-near-field communication chip 23 may be one of a cellular communication chip, a Wireless Fidelity (Wi-Fi) chip, a Global Positioning System (GPS) chip, or a Bluetooth (BT) chip, which is configured to implement the corresponding communication function.

The first non-near-field communication chip 23 may be disposed on the circuit board 30 of the electronic device 100, or may be integrated on an independent circuit board in the electronic device 100. The first non-near-field communication chip 23 is configured to provide a first non-near-field communication excitation current. The first non-near-field communication chip 23 is electrically connected to the radiator 21. For example, a feeding point 21b may be provided on the radiator 21, and the feeding point 21b may be denoted as a first feeding point. The first non-near-field communication chip 23 is electrically connected to the first feeding point 21b.

Therefore, the first non-near-field communication chip 23 can feed the first non-near-field communication excitation current to the radiator 21 through the first feeding point 21b. A part between the first feeding point 21b and the ground point 21a may be configured to transmit the first non-near-field communication excitation current. It can be understood that when the part between the first feeding point 21b and the ground point 21a transmits the first non-near-field communication excitation current, a first non-near-field communication signal can be radiated to the outside, thereby realizing a first non-near-field communication function of the electronic device 100. Therefore, the part between the first feeding point 21b and the ground point 21a can be used as a first non-near-field communication antenna to realize the first non-near-field communication function of the electronic device 100.

In some embodiments, as shown in FIG. 2, the second feeding point 21c and the first feeding point 21b are located on the same side of the ground point 21a. A distance between the second feeding point 21c and the ground point 21a is greater than a distance between the first feeding point 21b and the ground point 21a.

It should be noted that the frequency of the NFC signal is usually 13.56 MHz, the frequency of the cellular communication signal is usually above 700 MHz, the frequency of the Wi-Fi signal is usually 2.4 GHz or 5 GHz, the frequency of the GPS signal usually includes 1.575 GHz, 1.227 GHz, 1.381 GHz, 1.841 GHz and other frequency bands, and the frequency of the BT signal is usually 2.4 GHz. Therefore, compared with the cellular communication signal, the Wi-Fi signal, the GPS signal and the BT signal, the NFC signal is a low-frequency signal, while the cellular communication signal, the Wi-Fi signal, the GPS signal and the BT signal are high-frequency signals. Alternatively, it can be understood that the NFC signal is a low-frequency signal, and the first non-near-field communication signal is a high-frequency signal.

In addition, according to the principle of quarter-wavelength resonance, when transmitted, a wireless signal at a lower frequency leads to that a longer effective radiation length is required by an antenna, and a wireless signal at a higher frequency leads to that a shorter effective radiation length is required by the antenna. Therefore, when the distance between the second feeding point 21c and the ground point 21a is set to be greater than the distance between the first feeding point 21b and the ground point 21a, the effective radiation length of the NFC antenna can be increased, thereby increasing the NFC antenna performance.

Figure 5:
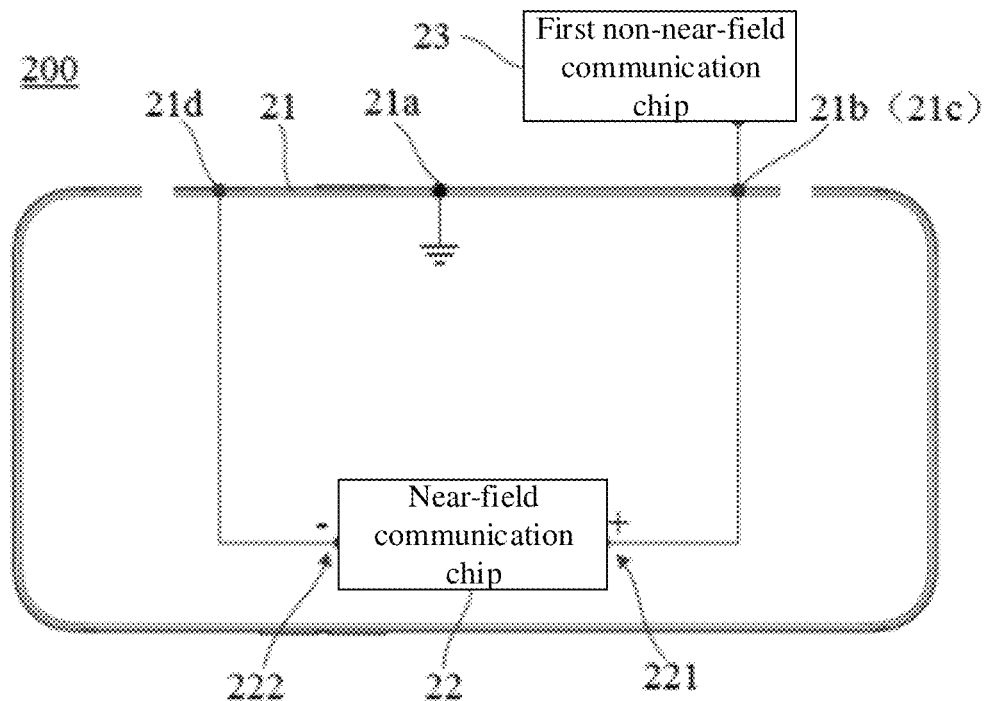
FIG. 5 is a schematic diagram of an antenna apparatus having a third structure according to an embodiment of the present disclosure.

In some embodiments, reference may be made to FIG. 5. FIG. 5 is a schematic diagram of an antenna apparatus 200 having a third structure according to an embodiment of the present disclosure.

A second feeding point 21c coincides with a first feeding point 21b. That is, an NFC chip 22 and a first non-near-field communication chip 23 share the feeding point 21b (or 21c). For example, when the first non-near-field communication chip 23 is a low-frequency cellular communication chip, that is, when a part between the first feeding point 21b and a ground point 21a is used as a low-frequency cellular antenna, due to a long effective radiation length of the low-frequency cellular antenna, the low-frequency cellular antenna can be reused as the NFC antenna. Therefore, the number of the feeding points on the radiator 21 can be reduced, and thus the design of the radiator 21 can be simplified.

In the antenna apparatus 200 according to the embodiment of the present disclosure, the part between the two ends of the radiator 21 that are electrically connected to the first differential signal terminal 221 and the second differential signal terminal 222 can be used as the NFC antenna. For example, the part between the second feeding point 21c and the third feeding point 21d can be used as the NFC antenna, and the part between the first feeding point 21b and the ground point 21a can be used as the first non-near-field communication antenna, so the reusing of the part between the first feeding point 21b and the ground point 21a can be realized, that is, the reusing of the first non-near-field communication antenna can be realized, so that the design of the NFC antenna can be simplified.

Figure 6:
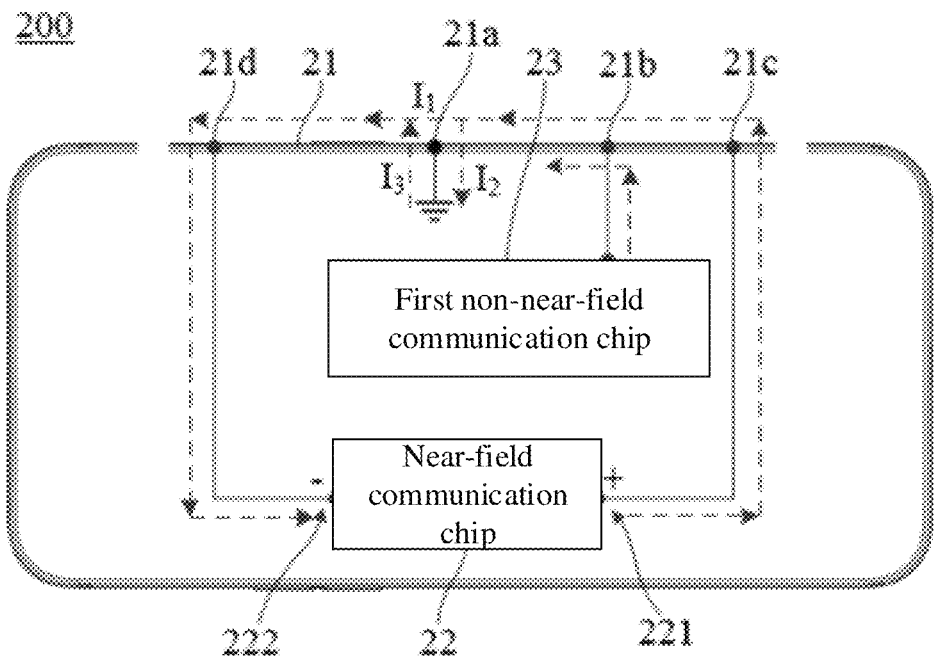
FIG. 6 is a schematic diagram of current transmission in the antenna apparatus shown in FIG. 2.

Reference will be made to FIG. 6. FIG. 6 is a schematic diagram of current transmission in the antenna apparatus 200 shown in FIG. 2.

The differential excitation current provided by the NFC chip 22 can be output to one end of the radiator 21 through a differential signal terminal (e.g., the first differential signal terminal 221), for example to the end where the first portion 211 is located, and then the differential excitation current is transmitted to the other end through the first portion 211, for example to the end where the second portion 212 is located, and the differential excitation current finally returns from the second portion 212 to the NFC chip 22 through the other differential signal terminal (e.g., the second differential signal terminal 222), so as to realize the transmission of the differential excitation current.

The first non-near-field communication excitation current provided by the first non-near-field communication chip 23 is output to the radiator 21 through the first feeding point 21b, then is transmitted to the ground point 21a, and finally returns to the ground, so as to achieve the transmission of the first non-near-field communication excitation current.

It should be noted that, in the process of the differential excitation current transmission, when the differential excitation current passes through the ground point 21a, a part of the current is directly transmitted through the ground point 21a to the other end of the radiator 21. For example, a current I1 is directly transmitted from the end where the second feeding point 21c is located through the ground point 21a to the end where the third feeding point 21d is located. The other part of the differential excitation current returns to the ground through the ground point 21a. For example, a current I2 returns to the ground through the ground point 21a. A part of the current returning to the ground returns to the radiator 21 through the ground point 21a, and continues to be transmitted to the NFC chip 22. For example, a current I3 returns to the radiator 21 through the ground point 21a and continues to be transmitted. The current I1 may be denoted as a first current, the current I2 may be denoted as a second current, and the current I3 may be denoted as a third current.

The current I1 accounts for most of the differential excitation current, a sum of the current I1 and the current I2 is a differential excitation current output by the NFC chip 22, and a sum of the current I1 and the current I3 is a differential excitation current that finally returns to the NFC chip 22. Here, the current I3 is less than the current I2. That is, the differential excitation current output by the NFC chip 22 is I1 and I2, and the differential excitation current that finally returns to the NFC chip 22 is I1 and I3. Therefore, the differential excitation current output by the NFC chip 22 will lose partially during transmission, and the lost current is the difference between I2 and I3. It can be understood that the loss of the differential excitation current means the loss of the NFC signal radiated to the outside by the radiator 21.

In order to reduce the loss of the differential excitation current output by the NFC chip 22 during the transmission process, the grounding structure of the radiator 21 can be designed to reduce the current I2 and finally reduce the difference between the current I2 and the current I3.

Figure 7:
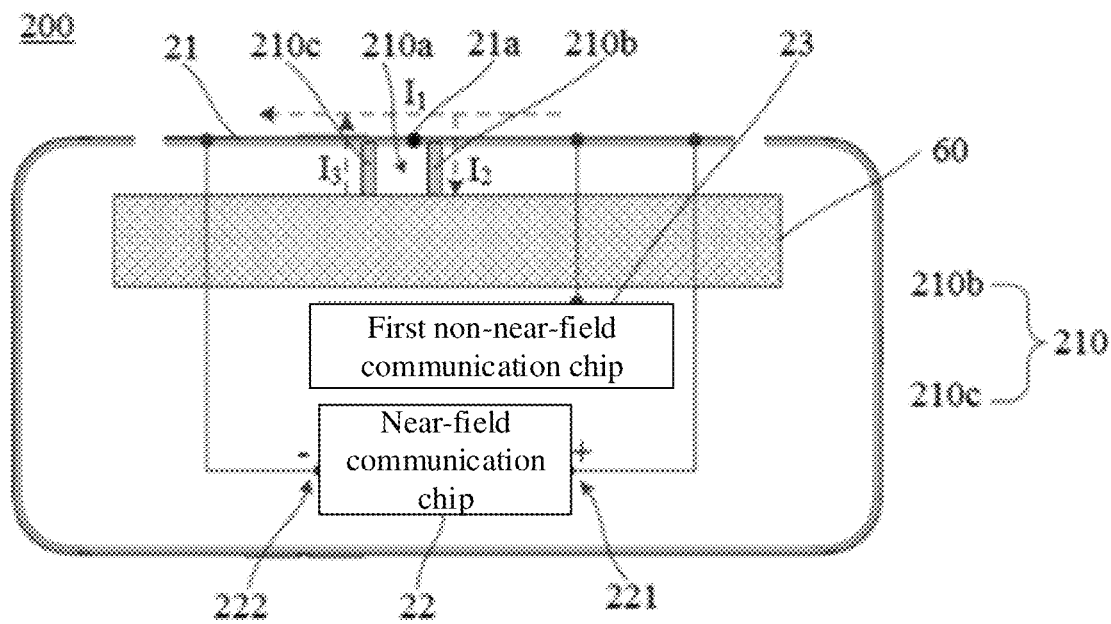
FIG. 7 is a schematic diagram of an antenna apparatus having a fourth structure according to an embodiment of the present disclosure.

In some embodiments, reference may be made to FIG. 7. FIG. 7 is a schematic diagram of an antenna apparatus 200 having a fourth structure according to an embodiment of the present disclosure.

The antenna structure 200 includes a grounding conductor 210. One end of the grounding conductor 210 is connected to a ground point 21a, and the other end of the grounding conductor 210 is grounded. For example, the electronic device 100 includes a metal middle frame 60 that may be formed as a system ground of the electronic device 100. The other end of the grounding conductor 210 may be connected to the metal middle frame 60 to realize being grounded. The grounding conductor 210 can be understood as a metal connecting rib between a radiator 21 and the metal middle frame 60. It can be understood that the grounding conductor 210 can be integrally formed with the metal middle frame 60, for example, can be integrally formed with the metal middle frame 60 by an injection molding process.

The grounding conductor 210 is configured to provide a grounding path for a first non-near-field communication excitation current, and a grounding path and a return path for a part of a differential excitation current. The grounding path can be understood as a path through which a current returns to a system ground, and the return path can be understood as a path through which a current returns from the system ground to the radiator 21. For example, the grounding conductor 210 may be used for the first non-near-field communication excitation current to flow to the system ground, for a second current I2 of the differential excitation current to flow to the system ground, and for a third current I3 of the differential excitation current to return from the system ground to the radiator 21.

It can be understood that the differential excitation current provided by the NFC chip 22 includes the first current I1, the second current I2 and the third current I3. The first current I1 flows through the radiator 21, the second current I2 returns to the ground through the grounding conductor 210, and the third current I3 returns to the radiator 21 through the grounding conductor 210. A value of the third current I3 is smaller than a value of the second current I2.

It can be understood that an effective current path of the differential excitation current on the radiator 21 is substantially equal to a length of the radiator 21 minus a width of the grounding conductor 210. Therefore, a larger width of the grounding conductor 210 leads to a shorter effective current path of the differential excitation current on the radiator 21, and thus to a more attenuated NFC performance. Conversely, a smaller width of the grounding conductor 210 leads to a longer effective current path of the differential excitation current on the radiator, and thus to a smaller impact on the NFC performance. From another perspective, a larger width of the grounding conductor 210 leads to a larger second current I2 of the differential excitation current that returns to ground through the grounding conductor 210, resulting in more loss and thus more attenuation of the NFC performance. On the contrary, a smaller width of the grounding conductor 210 leads to a smaller second current I2 of the differential excitation current that returns to ground through the grounding conductor 210, resulting in less loss and thereby reducing the impact of the arrangement of the grounding conductor 210 on the NFC performance. It can be understood that a magnitude of the second current I2 is positively correlated with the width of the grounding conductor 210 in an extending direction of the radiator 21. That is, a larger width of the grounding conductor 210 leads to a larger second current I2, and conversely, a smaller width of the grounding conductor 210 leads to a smaller second current I2.

In some embodiments, as shown in FIG. 7, a through slot 210a is defined on the grounding conductor 210. The through slot 210a extends through the grounding conductor 210. The through slot 210a divides the grounding conductor 210 into a first conductor part 210b and a second conductor part 210c. A sum of a width of the first conductor part 210b and a width of the second conductor part 210c is smaller than the width of the grounding conductor 210.

It can be understood that the through slot 210a divides the grounding conductor 210 into the first conductor part 210b and the second conductor part 210c, that is, the through slot 210a makes the grounding conductor 210 into a hollow shape. Therefore, the sum of the width of the first conductor part 210b and the width of the second conductor part 210c formed by hollowing out the grounding conductor 210 is smaller than the width of the grounding conductor 210. In some embodiments, a width of the first conductor part 210b is equal to a width of the second conductor part 210c. That is, the width of the first conductor part 210b and the width of the second conductor part 210c are kept equal.

The first conductor part 210b is configured to provide a grounding path for the first non-near-field communication excitation current, and a grounding path for a part of the differential excitation current. For example, the first conductor part 210b is configured to provide a grounding path for the first non-near-field communication excitation current and a grounding path for the second current I2. The second conductor part 210c is configured to provide a return path for a part of the differential excitation current. For example, the second conductor part 210c is configured to provide a return path for the third current I3.

It can be understood that after the through slot 210a divides the grounding conductor 210 into the first conductor part 210b and the second conductor part 210c, since the first conductor part 210b is configured to provide the grounding path for the second current I2, the magnitude of the second current I2 is positively correlated with the width of the first conductor part 210b.

Since the sum of the width of the first conductor part 210b and the width of the second conductor part 210c is smaller than the width of the grounding conductor 210, the width of the first conductor part 210b is smaller than the width of the grounding conductor 210. That is, a width of the grounding path of the second current I2 is reduced compared with the case where the through slot 210a is not defined, so the second current I2 can be reduced. It should be noted that when the second current I2 is reduced, the third current I3 can also be reduced proportionally, so that the difference between the second current I2 and the third current I3 can be reduced. That is, the loss of the differential excitation current provided by the NFC chip 22 during the transmission process can be reduced, thereby improving the performance of the NFC antenna. In addition, after the through slot 210a is defined on the grounding conductor 210, the formed first conductor part 210b can ensure that the first non-near-field communication excitation current returns to the ground, so the transmission of the first non-near-field communication excitation current will not be affected and the function of the first non-near-field communication antenna will not be affected. The following is an example of experimental data: in the research of the technical solution of the present disclosure, the researchers found that when the through slot 210a is not defined on the conductor structure 210, the measured intensity of the NFC magnetic field is 16.8526 A/m; when other conditions remain unchanged and the through slot 210a is defined on the conductor structure 210, the measured intensity of the NFC magnetic field is 18.133 A/m. It can be seen that after the through slot 210a is defined on the conductor structure 210, the intensity of the NFC magnetic field can be increased by 7.6%, that is, the performance of the NFC antenna can be increased by 7.6%.

Figure 8:
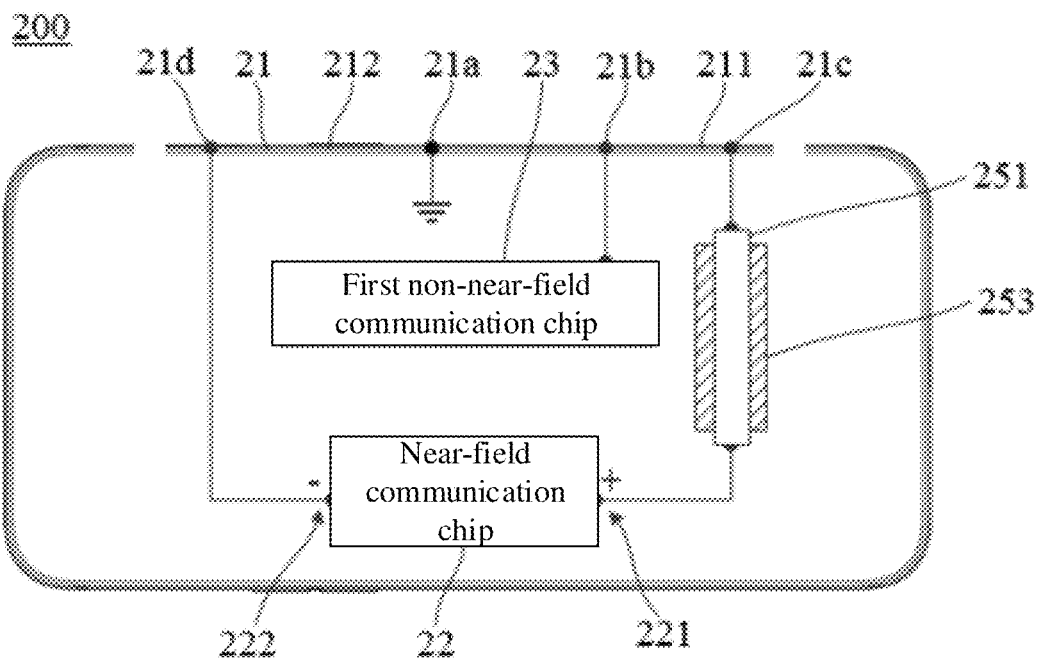
FIG. 8 is a schematic diagram of an antenna apparatus having a fifth structure according to an embodiment of the present disclosure.

In some embodiments, reference may be made to FIG. 8. FIG. 8 is a schematic diagram of an antenna apparatus 200 having a fifth structure according to an embodiment of the present disclosure.

The antenna apparatus 200 further includes a first Flexible Printed Circuit (FPC) 251. A first differential signal terminal 221 is electrically connected to a radiator 21 through the first flexible circuit board 251. For example, the first differential signal terminal 221 may be electrically connected to a second feeding point 21c of the radiator 21 through the first flexible circuit board 251. Therefore, the first flexible circuit board 251 can be configured to transmit a differential excitation current. It can be understood that when the first flexible circuit board 251 transmits the differential excitation current, it can also radiate an NFC signal to the outside, thereby increasing the effective radiation length of the NFC antenna, thereby improving the performance of the NFC antenna.

In some embodiments, the antenna apparatus 200 further includes a first magnetic field enhancer 253. The first magnetic field enhancer 253 may be made of a material such as an insulating material. For example, the first magnetic field enhancer 253 may include a ferrite layer, which is formed of a ferrite material. The ferrite material may be nickel-copper-zinc-based material with respectively prescribed contents of iron oxide, copper oxide, zinc oxide, and nickel oxide. In addition, the ferrite material may include some auxiliary materials, such as bismuth oxide, silicon oxide, magnesium oxide, cobalt oxide and other materials with respectively prescribed contents. The first magnetic field enhancer 253 can be configured to enhance an intensity of a magnetic field.

The first magnetic field enhancer 253 is disposed on a side of the first flexible circuit board 251. For example, the first magnetic field enhancer 253 may be disposed at a bottom side of the first flexible circuit board 251 and abut against the first flexible circuit board 251. The first magnetic field enhancer 253 can be configured to enhance the intensity of the magnetic field generated when the first flexible circuit board 251 transmits the differential excitation current, thereby improving the strength of the NFC signal and thus improving the performance of the NFC antenna.

Figure 9:
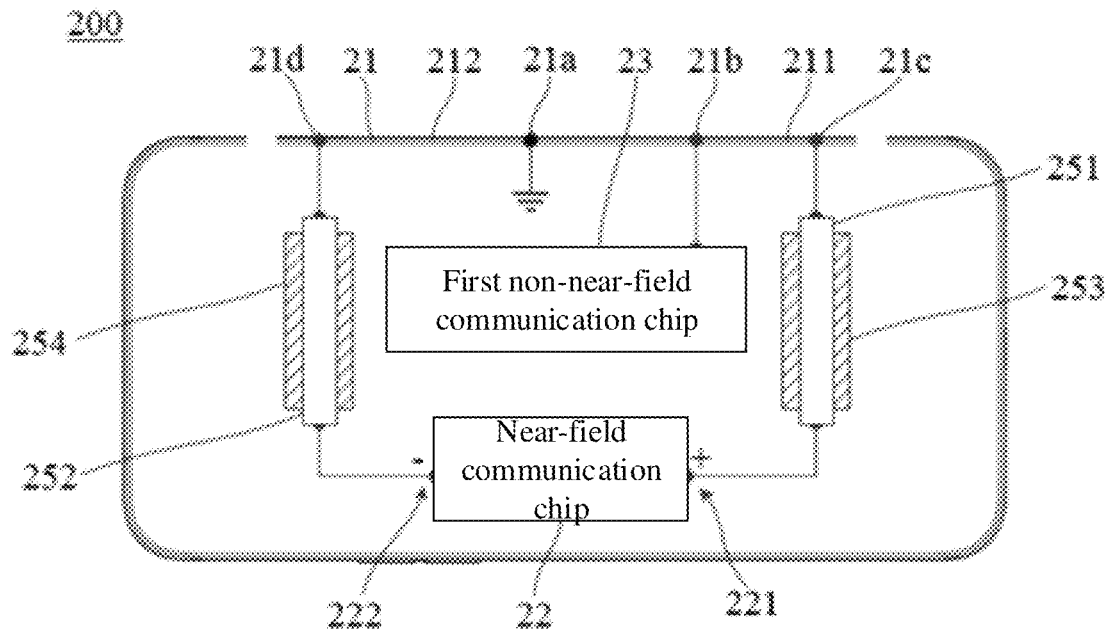
FIG. 9 is a schematic diagram of an antenna apparatus having a sixth structure according to an embodiment of the present disclosure.

In some embodiments, reference may be made to FIG. 9. FIG. 9 is a schematic diagram of an antenna apparatus 200 having a sixth structure according to an embodiment of the present disclosure.

The antenna apparatus 200 further includes a second flexible circuit board 252. The second differential signal terminal 222 is electrically connected to a radiator 21 through the second flexible circuit board 252. For example, a second differential signal terminal 222 may be electrically connected to a third feeding point 21d of a radiator 21 through the second flexible circuit board 252. Therefore, the second flexible circuit board 252 can be configured to transmit a differential excitation current. It can be understood that when the second flexible circuit board 252 transmits the differential excitation current, it can also radiate an NFC signal to the outside, thereby increasing the effective radiation length of the NFC antenna and improving the performance of the NFC antenna.

In some embodiments, the antenna apparatus 200 further includes a second magnetic field enhancer 254. The second magnetic field enhancer 254 may be made of a material such as an insulating material. For example, the second magnetic field enhancer 254 may include ferrite. The second magnetic field enhancer 254 can be configured to enhance the intensity of the magnetic field.

The second magnetic field enhancer 254 is disposed on a side of the second flexible circuit board 252. For example, the second magnetic field enhancer 254 may be disposed at a bottom side of the second flexible circuit board 252 and abut against the second flexible circuit board 252. The second magnetic field enhancer 254 can be configured to enhance the intensity of the magnetic field generated when the second flexible circuit board 252 transmits the differential excitation current, thereby improving the strength of the NFC signal and thus improving the performance of the NFC antenna.

Figure 10:
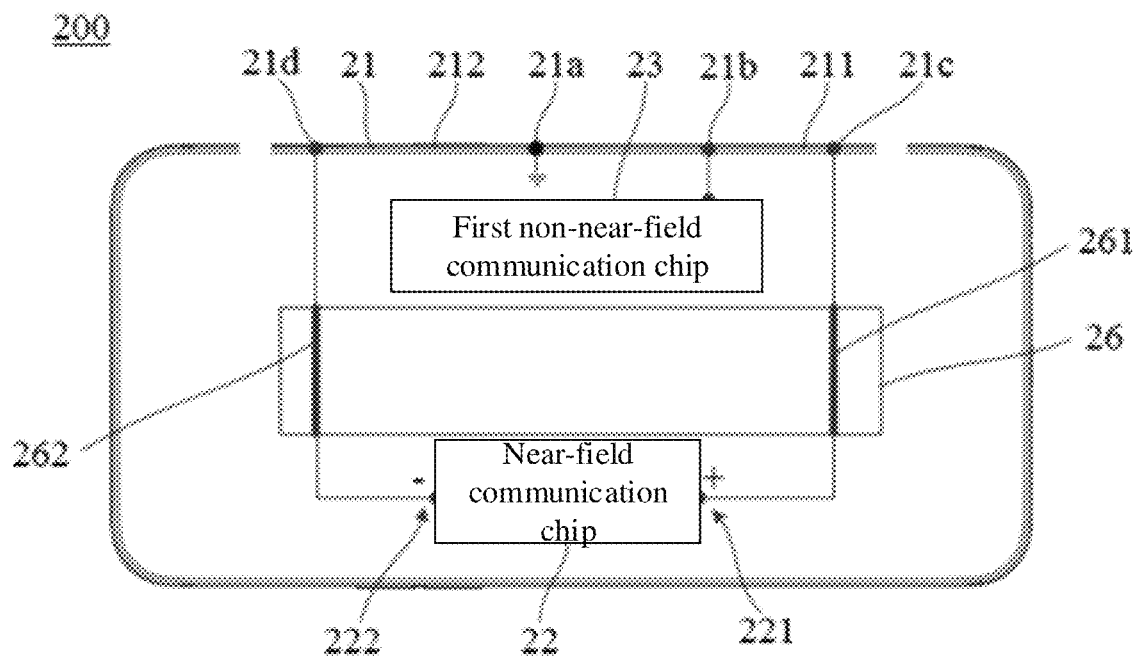
FIG. 10 is a schematic diagram of an antenna apparatus having a seventh structure according to an embodiment of the present disclosure.

In some embodiments, reference may be made to FIG. 10. FIG. 10 is a schematic diagram of an antenna apparatus 200 having a seventh structure according to an embodiment of the present disclosure.

The antenna apparatus 200 further includes a circuit board 26. The circuit board 26 may be a main circuit board of the electronic device 100. For example, the circuit board 26 may be the circuit board 30 of the electronic device 100. The circuit board 26 may be a circuit board provided separately in the electronic device 100. A first printed circuit 261 and a second printed circuit 262 are provided at intervals on the circuit board 26. Both the first printed circuit 261 and the second printed circuit 262 can be configured to transmit an electrical signal.

A first differential signal terminal 221 of an NFC chip 22 is electrically connected to a radiator 21 through the first printed circuit 261. For example, the first differential signal terminal 221 may be electrically connected to the second feeding point 21c of the radiator 21 through the first printed circuit 261. Therefore, the first printed circuit 261 can be configured to transmit the differential excitation current provided by the NFC chip 22 to increase the effective radiation length of the NFC antenna, thereby improving the performance of the NFC antenna.

The second differential signal terminal 222 of the NFC chip 22 is electrically connected to the radiator 21 through the second printed circuit 262. For example, a second differential signal terminal 222 may be electrically connected to the third feeding point 21d of the radiator 21 through the second printed circuit 262. Therefore, the second printed circuit 262 can be configured to transmit the differential excitation current provided by the NFC chip 22 to increase the effective radiation length of the NFC antenna, thereby improving the performance of the NFC antenna.

It should be noted that in some other embodiments, only one printed circuit may be provided on the circuit board 26. For example, only the first printed circuit 261 or only the second printed circuit 262 may be provided. The printed circuit 261 or the second printed circuit 262 transmits the differential excitation current, which can increase the effective radiation length of the NFC antenna, thereby improving the performance of the NFC antenna.

Figure 11:
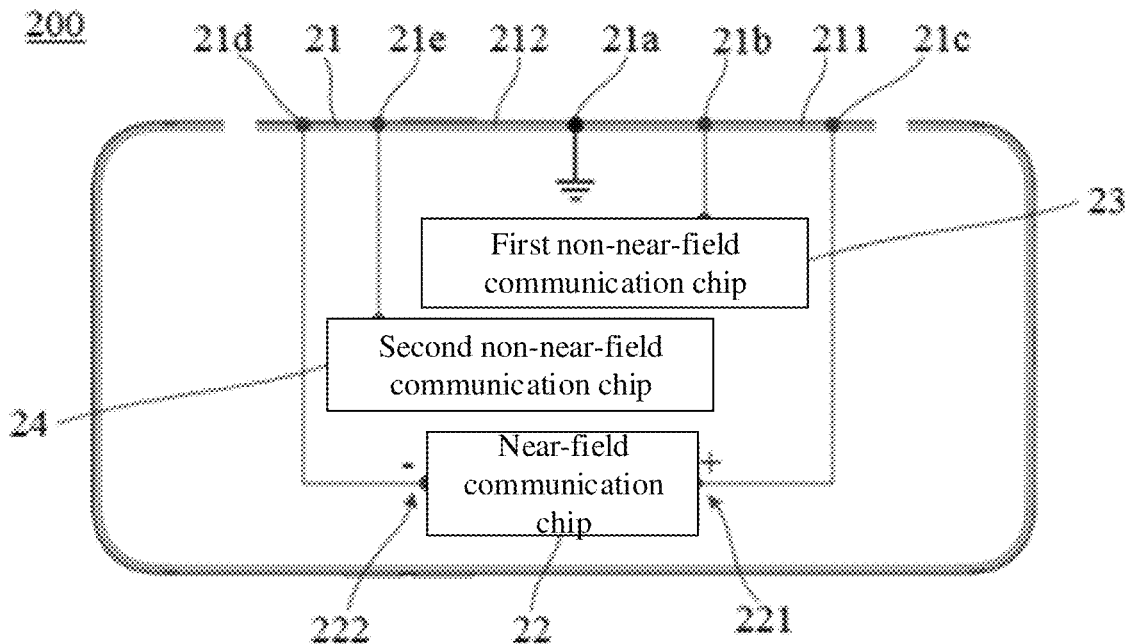
FIG. 11 is a schematic diagram of an antenna apparatus having an eighth structure according to an embodiment of the present disclosure.

In some embodiments, reference may be made to FIG. 11. FIG. 11 is a schematic diagram of an antenna apparatus 200 having an eighth structure according to an embodiment of the present disclosure.

The antenna apparatus 200 further includes a second non-near-field communication chip 24. The second non-near-field communication chip 24 may be one of a cellular communication chip, a Wi-Fi chip, a GPS chip, or a BT chip, for implementing corresponding communication functions.

The second non-near-field communication chip 24 may be disposed on the circuit board 30 of the electronic device 100, or may be integrated on an independent circuit board in the electronic device 100. The second non-near-field communication chip 24 is configured to provide a second non-near-field communication excitation current.

The radiator 21 further includes a fourth feeding point 21e. The fourth feeding point 21e and the first feeding point 21b are located on opposite sides of the ground point 21a. For example, the first feeding point 21b is located on the first portion 211, and the fourth feeding point 21e is located on the second portion 212.

The second non-near field communication chip 24 is electrically connected to the radiator 21. For example, the second non-near-field communication chip 24 may be electrically connected to the fourth feeding point 21e. Thus, a part between the fourth feeding point 21e and the ground point 21a can be configured to transmit the second non-near-field communication excitation current. It can be understood that when the part between the fourth feeding point 21e and the ground point 21a transmits the second non-near-field communication excitation current, a second non-near-field communication signal can be radiated to the outside, thereby realizing a second non-near-field communication function of the electronic device 100. Therefore, the part between the fourth feeding point 21e and the ground point 21a can be used as a second non-near-field communication antenna to realize the second non-near-field communication function of the electronic device 100.

In some embodiments, as shown in FIG. 11, the third feeding point 21*d* and the fourth feeding point 21*e* are located on the same side of the ground point 21*a*. A distance between the third feeding point 21*d* and the ground point 21*a* is greater than a distance between the fourth feeding point 21*e* and the ground point 21*a*. It can be understood that when the distance between the third feeding point 21*d* and the ground point 21*a* is set to be greater than the distance between the fourth feeding point 21*e* and the ground point 21*a*, the effective radiation length of the NFC antenna can be increased, and thereby the performance of the NFC antenna can be improved.

Figure 12:
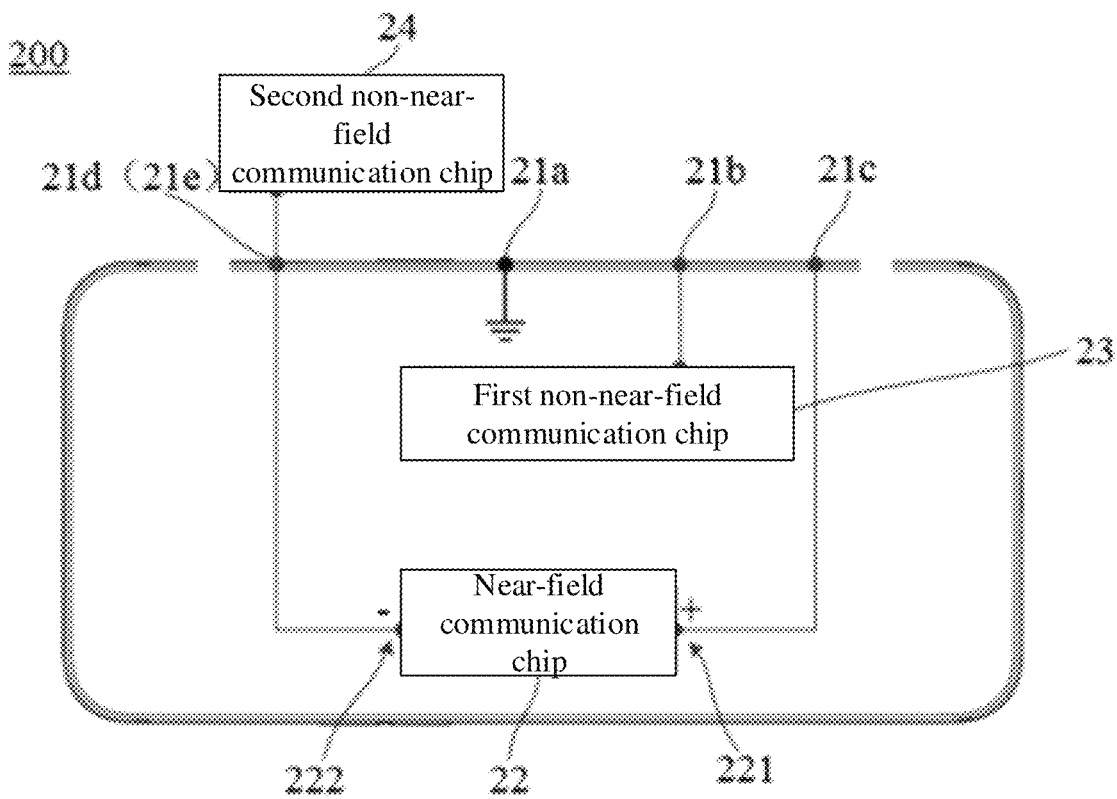
FIG. 12 is a schematic diagram of an antenna apparatus having a ninth structure according to an embodiment of the present disclosure.

In some embodiments, reference may be made to FIG. 12. FIG. 12 is a schematic diagram of an antenna apparatus 200 having a ninth structure according to an embodiment of the present disclosure.

The third feeding point 21*d* coincides with the fourth feeding point 21*e*. That is, the NFC chip 22 and the second non-near-field communication chip 24 share the feeding point 21*d* (or 21*e*). For example, when the second non-near-field communication chip 24 is a low-frequency cellular communication chip, that is, when the part between the fourth feeding point 21*e* and the ground point 21*a* is used as a low-frequency cellular antenna, due to the long effective radiation length of the low-frequency cellular antenna, the low-frequency cellular antenna can be reused as an NFC antenna. Therefore, the number of feeding points on the radiator 21 can be reduced, and thus the design of the radiator 21 can be simplified.

It should be noted that, in practical applications, the second non-near-field communication chip 24 and the first non-near-field communication chip 23 may be chips of the same type or function, for example, both may be medium or high frequency cellular communication chips, and configured to realize the medium or high-frequency cellular communication function. The second non-near-field communication chip 24 and the first non-near-field communication chip 23 may be chips of different types or functions. The second non-near-field communication chip 24 can be, for example, a GPS chip, configured to realize GPS communication, such as to realize GPS L5 frequency band communication. The first non-near-field communication chip 23 may be, for example, a medium or high frequency cellular communication chip, which is configured to implement a medium or high frequency cellular communication function.

It should also be noted that when the antenna apparatus 200 includes both the first non-near-field communication chip 23 and the second non-near-field communication chip 24, the first non-near-field communication chip 23 and the second non-near-field communication chip 24 may be integrated into one chip, and the integrated one chip may simultaneously provide the first non-near-field communication excitation current and the second non-near-field communication excitation current.

It can be understood that with the development of communication technology and the arrival of the 5G era, more and more antennas need to be set on electronic devices such as smartphones, and the communication frequency of the antennas is getting higher and higher, for example, the gradual transition from 4G communication to 5G communication. Therefore, each antenna has less and less layout space, and the radiation length of each antenna is getting shorter and shorter. In the antenna apparatus 200 according to the embodiment of the present disclosure, the part between the first feeding point 21*b* and the ground point 21*a* on the radiator 21 can be used as the first non-near-field communication antenna, the part between fourth feeding point 21*e* and the ground point 21*a* can be used as the second non-near-field communication antenna, and the part between the first feeding point 21*b* and the fourth feeding point 21*e* can be reused as the NFC antenna, so the NFC antenna can be reused as the first non-near-field communication antenna and the second non-near-field communication antenna at the same time. In this way, the radiation length of the NFC antenna can be increased and the performance of the NFC antenna can be improved.

In addition, since the NFC antenna can simultaneously be reused as the first non-near-field communication antenna and the second non-near-field communication antenna, no matter where the ground point 21*a* is disposed on the radiator 21, that is, no matter how the radiation length of the first non-near-field communication antenna changes, and no matter how the radiation length of the second non-near-field communication antenna changes, the NFC antenna can be reused as the first non-near-field communication antenna and the second non-near-field communication antenna and the radiation length of the NFC antenna will not be affected. Therefore, it can ensure that the radiation length of the NFC antenna meets the requirements of the NFC antenna and the performance of the NFC antenna can be improved.

Figure 13:
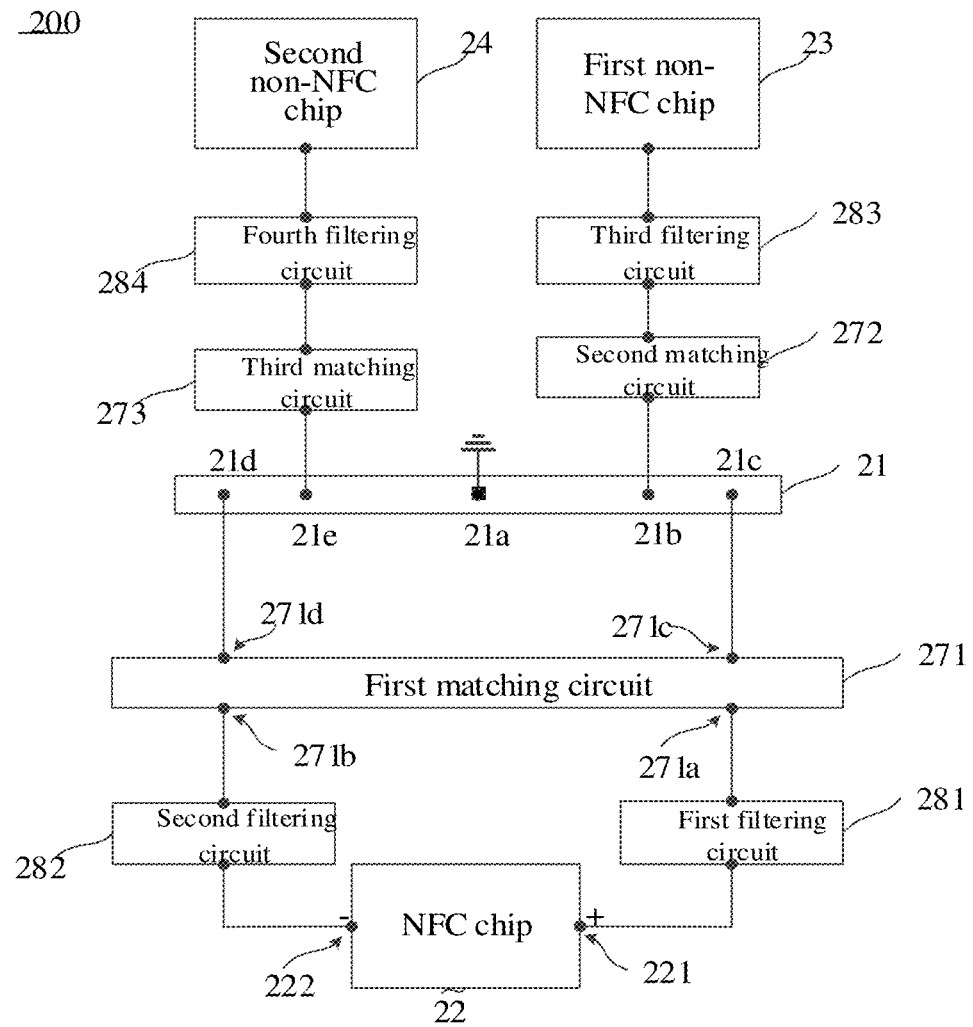
FIG. 13 is a schematic diagram of an antenna apparatus having a tenth structure according to an embodiment of the present disclosure.

In some embodiments, reference may be made to FIG. 13. FIG. 13 is a schematic diagram of an antenna apparatus 200 having a tenth structure according to an embodiment of the present disclosure.

The antenna apparatus 200 further includes a first matching circuit 271, a second matching circuit 272, a third matching circuit 273, a first filtering circuit 281, a second filtering circuit 282, a third filtering circuit 283 and a fourth filtering circuit 284. It can be understood that the term "matching circuit" can be referred to as a matching network, a tuning circuit, a tuning network and the like. The term "filtering circuit" may be referred to as a filtering network.

The first differential signal terminal 221 and the second differential signal terminal 222 of the NFC chip 22 are respectively electrically connected to both ends of the radiator 21 through the first matching circuit 271. For example, the first matching circuit 271 is electrically connected to the first differential signal terminal 221 of the NFC chip 22, the second differential signal terminal 222 of the NFC chip 22, the second feeding point 21*c* of the radiator 21, and the third feeding point 21*d* of the radiator 21. The first matching circuit 271 is configured to match an impedance of the part between the two ends when the part between the two ends transmitting the differential excitation current. For example, the first matching circuit 271 is configured to match an impedance of the part between the second feeding point 21*c* and the third feeding point 21*d* when the part between the second feeding point 21*c* and the third feeding point 21*d* transmitting the differential excitation current.

The first matching circuit 271 includes a first input terminal 271*a*, a second input terminal 271*b*, a first output terminal 271*c*, and a second output terminal 271*d*. The first input terminal 271*a* is electrically connected to the first differential signal terminal 221, the second input terminal 271*b* is electrically connected to the second differential signal terminal 222, the first output terminal 271*c* is electrically connected to the second feeding point 21*c*, and the second output terminal 271*d* is electrically connected to the third feeding point 21*d*.

The first filtering circuit 281 is disposed between the first differential signal terminal 221 and the first input terminal 271*a*. The first filtering circuit 281 is configured to filter out a first interference signal between the first differential signal terminal 221 and the first input terminal 271*a*. The first interference signal is an electrical signal other than the differential excitation current provided by the NFC chip 22.

The second filtering circuit 282 is disposed between the second differential signal terminal 222 and the second input terminal 271*b*. The second filtering circuit 282 is configured to filter out a second interference signal between the second differential signal terminal 222 and the second input terminal 271*b*. The second interference signal is an electrical signal other than the differential excitation current provided by the NFC chip 22.

The first non-near-field communication chip 23 is electrically connected to the first feeding point 21*b* through the second matching circuit 272. For example, the second matching circuit 272 is electrically connected to the first non-near-field communication chip 23 and the first feeding point 21*b* of the radiator 21. The second matching circuit 272 is configured to match the impedance of the part between the first feeding point 21*b* and the ground point 21*a* when the part between the first feeding point 21*b* and the ground point 21*a* transmitting the first non-near-field communication excitation current.

The third filtering circuit 283 is disposed between the first non-near-field communication chip 23 and the second matching circuit 272. The third filtering circuit 283 is configured to filter out a third interference signal between the first non-near-field communication chip 23 and the second matching circuit 272. The third interference signal is an electrical signal other than the first non-near-field communication excitation current provided by the first non-near-field communication chip 23.

The second non-near-field communication chip 24 is electrically connected to the fourth feeding point 21*e* through the third matching circuit 273. For example, the third matching circuit 273 is electrically connected to the second non-near-field communication chip 24 and the fourth feeding point 21*e* of the radiator 21. The third matching circuit 273 is configured to match an impedance of the part between the fourth feeding point 21*e* and the ground point 21*a* when the part between the fourth feeding point 21*e* and the ground point 21*a* transmitting the second non-near-field communication excitation current.

The fourth filtering circuit 284 is disposed between the second non-near-field communication chip 24 and the third matching circuit 273. The fourth filtering circuit 284 is configured to filter out a fourth interference signal between the second non-near-field communication chip 24 and the third matching circuit 273. The fourth interference signal is an electrical signal other than the second non-near-field communication excitation current provided by the second non-near-field communication chip 24.

It can be understood that the first matching circuit 271, the second matching circuit 272, and the third matching circuit 273 may each include a circuit composed of capacitors and inductors connected in series or in parallel. The first filtering circuit 281, the second filtering circuit 282, the third filtering circuit 283, and the fourth filtering circuit 284 may each include a circuit composed of capacitors and inductors connected in series or in parallel.

Figure 14:
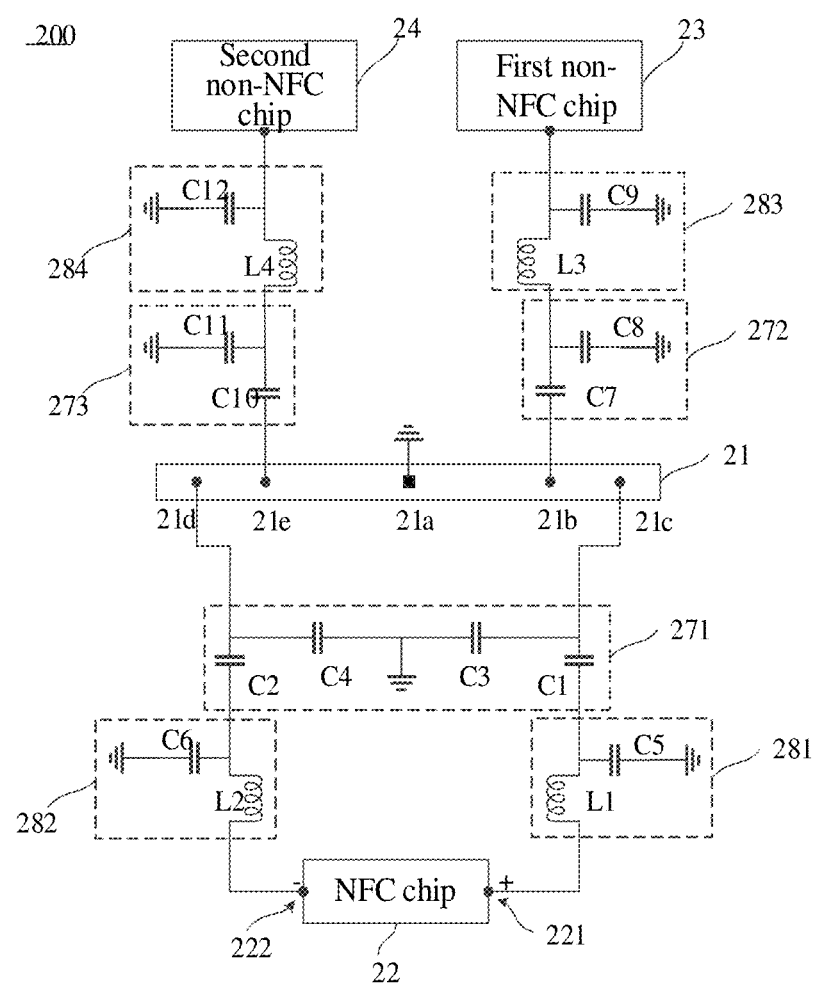
FIG. 14 is a schematic diagram of an antenna apparatus having an eleventh structure according to an embodiment of the present disclosure.

In some embodiments, reference may be made to FIG. 14. FIG. 14 is a schematic diagram of an antenna apparatus having an eleventh structure according to an embodiment of the present disclosure.

A first matching circuit 271 may include, for example, four capacitors C1, C2, C3, and C4. The capacitor C1 is connected in series with a first differential signal terminal 221 of the NFC chip 22, and the capacitor C2 is connected in series with a second differential signal terminal 222 of the NFC chip 22. The capacitor C3 and the capacitor C4 are connected in series and they are connected in parallel with the NFC chip 22. A part between the capacitor C3 and the capacitor C4 is grounded. It can be understood that the capacitance values of the capacitors C1, C2, C3, and C4 can be set according to actual needs.

A first filtering circuit 281 may include, for example, an inductor L1 and a capacitor C5. The inductor L1 is connected in series between the first differential signal terminal 221 and the first matching circuit 271, and the capacitor C5 is connected in parallel with the NFC chip 22 and is grounded. It can be understood that the inductance value of the inductor L1 and the capacitance value of the capacitor C5 can be set according to actual needs.

A second filtering circuit 282 may include, for example, an inductor L2 and a capacitor C6. The inductor L2 is connected in series between the second differential signal terminal 222 and the first matching circuit 271, and the capacitor C6 is connected in parallel with the NFC chip 22 and is grounded. It can be understood that the inductance value of the inductor L2 and the capacitance value of the capacitor C6 can be set according to actual needs.

A second matching circuit 272 may include, for example, capacitors C7 and C8. The capacitor C7 is connected in series between the first feeding point 21*b* of the radiator 21 and the first non-near-field communication chip 23, and the capacitor C8 is connected in parallel with the first non-near-field communication chip 23 and is grounded. It can be understood that the capacitance values of the capacitors C7 and C8 can be set according to actual needs.

A third filtering circuit 283 may include, for example, an inductor L3 and a capacitor C9. The inductor L3 is connected in series between the first non-near-field communication chip 23 and the second matching circuit 272, and the capacitor C9 is connected in parallel with the first non-near-field communication chip 23 and is grounded. It can be understood that the inductance value of the inductor L3 and the capacitance value of the capacitor C9 can be set according to actual needs.

A third matching circuit 273 may include, for example, capacitors C10 and C11. The capacitor C10 is connected in series between the fourth feeding point 21*e* of the radiator 21 and the second non-near-field communication chip 24, and the capacitor C11 is connected in parallel with the second non-near-field communication chip 24 and is grounded. It can be understood that the capacitance values of the capacitors C10 and C11 can be set according to actual needs.

A fourth filtering circuit 284 may include, for example, an inductor L4 and a capacitor C12. The inductor L4 is connected in series between the second non-near-field communication chip 24 and the third matching circuit 273, and the capacitor C12 is connected in parallel with the second non-near-field communication chip 24 and is grounded. It can be understood that the inductance value of the inductor L4 and the capacitance value of the capacitor C12 can be set according to actual needs.

Figure 15:
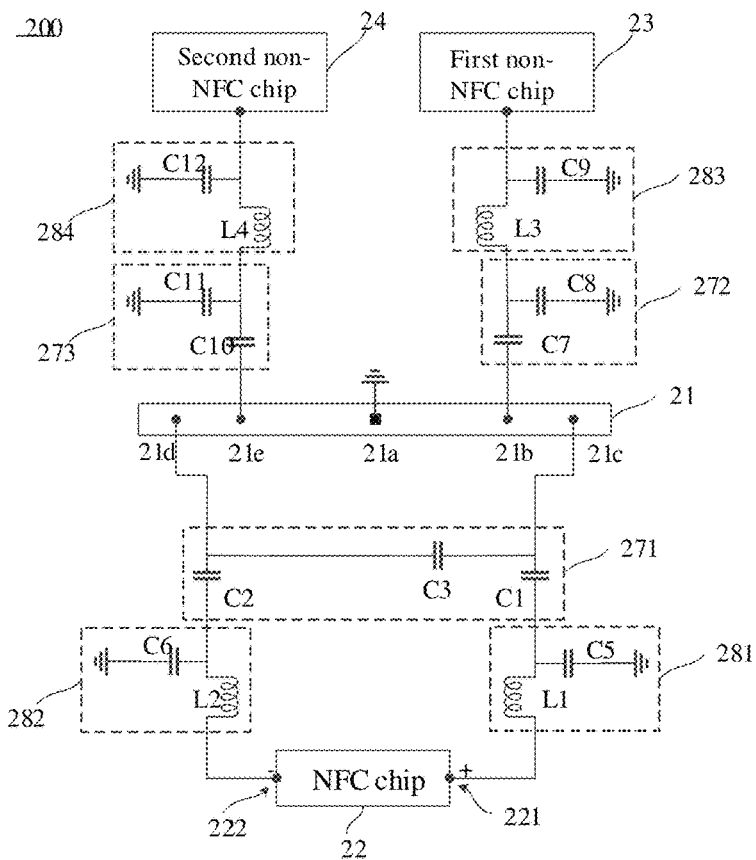
FIG. 15 is a schematic diagram of an antenna apparatus having a twelfth structure according to an embodiment of the present disclosure.

In some embodiments, reference may be made to FIG. 15. FIG. 15 is a schematic diagram of an antenna apparatus 200 having a twelfth structure according to an embodiment of the present disclosure. The antenna apparatus 200 as shown in FIG. 15 has a structure similar to that of the antenna apparatus 200 as shown in FIG. 14. The only difference therebetween is the structure of the first matching circuit 271.

As shown in FIG. 15, a first matching circuit 271 may include, for example, three capacitors. The three capacitors are a first capacitor C1, a second capacitor C2 and a third capacitor C3. The first capacitor C1 is connected in series with a first differential signal terminal 221 of the NFC chip 22, and the second capacitor C2 is connected in series with a second differential signal terminal 222 of the NFC chip 22. The third capacitor C3 is connected in parallel with the NFC chip 22, and is connected between the first capacitor C1 and the second capacitor C2. It is to be noted that, the capacitor C3 is not grounded. It can be understood that the capacitance values of the capacitors C1, C2 and C3 can be set according to actual needs.

For description of other portions of the antenna apparatus 200 in FIG. 15, reference may be made to the description of the antenna apparatus 200 in FIG. 14, and description thereof will be omitted here for simplicity.

Figure 16:
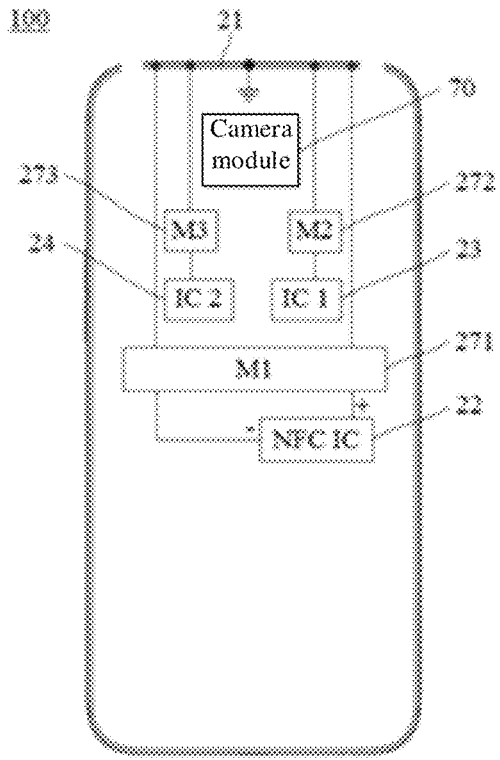
FIG. 16 is a schematic diagram of an electronic device having a third structure according to an embodiment of the present disclosure.

In some embodiments, reference may be made to FIG. 16. FIG. 16 is a schematic diagram of an electronic device 100 having a third structure according to an embodiment of the present disclosure.

The electronic device 100 further includes a camera module 70. The camera module 70 can be configured to take photos, shoot pictures, and the like. The camera module 70 may be fixed on the circuit board or the middle frame of the electronic device 100.

A current path of the differential excitation current provided by the NFC chip 22 surrounds the camera module 70. The current path of the differential excitation current is a current path in which the differential excitation current provided by the NFC chip 22 is output from a differential signal terminal, passes through the radiator 21, and finally returns to the other differential signal terminal of the NFC chip 22. For example, the current path may include a current path formed by the first differential signal terminal 221 of the NFC chip 22, the radiator 21, and the second differential signal terminal 222 of the NFC chip 22.

As shown in FIG. 16, the NFC IC is the NFC chip 22, IC 1 is the first non-near-field communication chip 23, IC 2 is the second non-near-field communication chip 24, M1 is the first matching circuit 271, M2 is the second matching circuit 272, and M3 is the third matching circuit 273.

The antenna apparatus and the electronic device according to the embodiments of the present disclosure are described in detail above. The principles and implementations of the present disclosure are described herein by using specific examples, and the descriptions of the above embodiments are only used to help the understanding of the present disclosure. At the same time, for those skilled in the art, changes may be made in the specific embodiments and application scope according to the idea of the present disclosure. To sum up, the content of this specification should not be construed as a limitation on the present disclosure.

What is claimed is:

1. An antenna apparatus, comprising:
   a radiator comprising a ground point and a first feeding point that are spaced apart from each other, the ground point being grounded;
   a near-field communication chip comprising a first differential signal terminal and a second differential signal terminal, the first differential signal terminal and the second differential signal terminal being configured to provide a differential excitation current, the first differential signal terminal and the second differential signal terminal being respectively electrically connected to two ends of the radiator, and a part between the two ends being configured to transmit the differential excitation current;
   a first non-near-field communication chip configured to provide a first non-near-field communication excitation current, the first non-near-field communication chip being electrically connected to the first feeding point, and a part between the first feeding point and the ground point being configured to transmit the first non-near-field communication excitation current; and
   a grounding conductor having one end connected to the ground point and another end grounded, and the grounding conductor being configured to provide a grounding path for the first non-near-field communication excitation current and provide a grounding path and a return path for a part of the differential excitation current.

2. The antenna apparatus of claim 1, wherein
   the differential excitation current comprises a first current flowing through the radiator, a second current returning to ground through the grounding conductor, and a third current returning to the radiator through the grounding conductor, and a value of the third current is smaller than a value of the second current.

3. The antenna apparatus of claim 2, wherein
   a magnitude of the second current is positively correlated with a width of the grounding conductor in an extending direction of the radiator.

4. The antenna apparatus of claim 1, wherein
   the grounding conductor has a through slot defined thereon, the through slot divides the grounding conductor into a first conductor part and a second conductor part, and a sum of a width of the first conductor part and a width of the second conductor part is smaller than a width of the grounding conductor.

5. The antenna apparatus of claim 4, wherein
   a width of the first conductor part is equal to a width of the second conductor part.

6. The antenna apparatus of claim 4, wherein
   the first conductor part is configured to provide the grounding path for the first non-near-field communication excitation current and provide the grounding path for the part of the differential excitation current, and the second conductor part is configured to provide the return path for the part of the differential excitation current.

7. The antenna apparatus of claim 1, further comprising:
   a first flexible circuit board through which the first differential signal terminal is electrically connected to the radiator, the first flexible circuit board being configured to transmit the differential excitation current; and
   a first magnetic field enhancer disposed on a side of the first flexible circuit board, the first magnetic field enhancer being configured to enhance an intensity of a magnetic field generated when the first flexible circuit board transmits the differential excitation current.

8. The antenna apparatus of claim 7, further comprising:
   a second flexible circuit board through which the second differential signal terminal is electrically connected to the radiator, the second flexible circuit board being configured to transmit the differential excitation current; and
   a second magnetic field enhancer disposed on a side of the second flexible circuit board, the second magnetic field enhancer being configured to enhance an intensity of a magnetic field generated when the second flexible circuit board transmits the differential excitation current.

9. The antenna apparatus of claim 1, further comprising:
a first matching circuit through which the first differential signal terminal and the second differential signal terminal are respectively electrically connected to the two ends of the radiator, the first matching circuit being configured to match an impedance of the part between the two ends when transmitting the differential excitation current.

10. The antenna apparatus of claim 9, wherein the first matching circuit comprises:
a first capacitor connected in series with the first differential signal terminal of the near-field communication chip,
a second capacitor connected in series with the second differential signal terminal of the near-field communication chip; and
a third capacitor connected in parallel with the near-field communication chip, the third capacitor being connected between the first capacitor and the second capacitor and not being grounded.

11. An antenna apparatus, comprising:
a radiator comprising a ground point;
a grounding conductor having one end connected to the ground point and another end grounded; and
a near-field communication chip comprising a first differential signal terminal and a second differential signal terminal, the first differential signal terminal and the second differential signal terminal being configured to provide a differential excitation current, the first differential signal terminal and the second differential signal terminal being respectively electrically connected to two ends of the radiator, and a part between the two ends being configured to transmit the differential excitation current,
wherein the grounding conductor is configured to provide a grounding path and a return path for the differential excitation current.

12. The antenna apparatus of claim 11, wherein
the grounding conductor has a through slot defined thereon, the through slot divides the grounding conductor into a first conductor part and a second conductor part, and a sum of a width of the first conductor part and a width of the second conductor part is smaller than a width of the grounding conductor; and
the first conductor part is configured to provide the grounding path for a part of the differential excitation current, and the second conductor part is configured to provide the return path for a part of the differential excitation current.

13. The antenna apparatus of claim 12, wherein
the differential excitation current comprises a first current flowing through the radiator, a second current returning to ground through the grounding conductor, and a third current returning to the radiator through the grounding conductor, and a value of the third current is smaller than a value of the second current; and
the first conductor part is configured to provide a grounding path for the second current, and the second conductor part is configured to provide a return path for the third current.

14. The antenna apparatus of claim 13, wherein
a magnitude of the second current is positively correlated with a width of the first conductor part.

15. The antenna apparatus of claim 12, wherein
a width of the first conductor part is equal to a width of the second conductor part.

16. The antenna apparatus of claim 11, wherein
the radiator further comprises a first feeding point;
the antenna apparatus further comprises a first non-near-field communication chip configured to provide a first non-near-field communication excitation current, the first non-near-field communication chip is electrically connected to the first feeding point, and a part between the first feeding point and the ground point is configured to transmit the first non-near-field communication excitation current.

17. The antenna apparatus of claim 11, further comprising:
a first flexible circuit board through which the first differential signal terminal is electrically connected to the radiator, the first flexible circuit board being configured to transmit the differential excitation current; and
a first magnetic field enhancer disposed on a side of the first flexible circuit board, the first magnetic field enhancer being configured to enhance an intensity of a magnetic field generated when the first flexible circuit board transmits the differential excitation current.

18. The antenna apparatus of claim 11, further comprising:
a second flexible circuit board through which the second differential signal terminal is electrically connected to the radiator, the second flexible circuit board being configured to transmit the differential excitation current; and
a second magnetic field enhancer disposed on a side of the second flexible circuit board, the second magnetic field enhancer being configured to enhance an intensity of a magnetic field generated when the second flexible circuit board transmits the differential excitation current.

19. An electronic device, comprising:
an antenna apparatus comprising:
a radiator comprising a ground point;
a grounding conductor having one end connected to the ground point and another end grounded; and
a near-field communication chip comprising a first differential signal terminal and a second differential signal terminal, the first differential signal terminal and the second differential signal terminal being configured to provide a differential excitation current, the first differential signal terminal and the second differential signal terminal being respectively electrically connected to two ends of the radiator, and a part between the two ends being configured to transmit the differential excitation current,
wherein the grounding conductor is configured to provide a grounding return path and a current return path for the differential excitation current; and
a metal frame having a metal branch formed thereon, the metal branch forming the radiator of the antenna apparatus.

20. The electronic device of claim 19, wherein the grounding conductor has a through slot defined thereon, the through slot divides the grounding conductor into a first conductor part and a second conductor part, and a sum of a width of the first conductor part and a width of the second conductor part is smaller than a width of the grounding conductor.

* * * * *